United States Patent
Kelkar (12)

(10) Patent No.: US 6,687,690 B2
(45) Date of Patent: Feb. 3, 2004

(54) EMPLOYING A COMBINED FUNCTION FOR EXCEPTION EXPLORATION IN MULTIDIMENSIONAL DATA

(75) Inventor: Bhooshan Prafulla Kelkar, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 09/881,370

(22) Filed: Jun. 14, 2001

(65) Prior Publication Data

US 2002/0198919 A1 Dec. 26, 2002

(51) Int. Cl.$^7$ ................................................ G06F 17/30
(52) U.S. Cl. ................... 707/3; 707/5; 707/2; 707/102
(58) Field of Search ............................... 707/1, 2, 3, 5, 707/6, 7, 10, 102

(56) References Cited

U.S. PATENT DOCUMENTS

| | | | |
|---|---|---|---|
| 5,778,369 A | 7/1998 | Pascoe et al. ............... 707/100 |
| 5,884,062 A | 3/1999 | Wichman et al. ........... 395/394 |
| 5,890,151 A | * 3/1999 | Agrawal et al. ............... 707/5 |
| 5,911,069 A | 6/1999 | Beard ........................ 395/683 |
| 5,923,863 A | 7/1999 | Adler et al. ................ 395/392 |
| 5,926,820 A | 7/1999 | Agrawal et al. ........... 707/200 |
| 5,978,788 A | 11/1999 | Castelli et al. ................ 707/2 |
| 6,003,029 A | 12/1999 | Agrawal et al. ............... 707/7 |
| 6,006,247 A | 12/1999 | Browning et al. .......... 709/102 |
| 6,085,312 A | 7/2000 | Abdallah et al. ........... 712/208 |
| 6,094,651 A | 7/2000 | Agrawal et al. ............... 707/5 |
| 6,108,647 A | * 8/2000 | Poosala et al. ................ 707/1 |
| 6,205,491 B1 | 3/2001 | Callsen et al. .............. 709/315 |
| 6,216,222 B1 | 4/2001 | Hinds et al. ................ 712/244 |
| 2001/0054034 A1 | 12/2001 | Arning et al. |

OTHER PUBLICATIONS

Surajit Chaudhuri, Umeshwar Dayal; An Overview of data warehousing and OLAP technology; ACM SIGMOD Record, Mar. 1997, vol. 26, Issue 1.*

Rónán Páircéir, Sally McClean, Bryan Scotney; Discovery of multi–level rules and exceptions from a distributed database; Proceedings of the sixth ACM SIGKDD internatioal conference on Knowledge discovery and data mining, Aug. 2000.*

Inspec Abstract No. C9808–6130–005 "Discovery–driven exploration of * OLAP * data cubes" Sarawagi et al. Jul. 9, 2000.

Abstract No. ARC919990078 "System and Method for Explaining Exceptions in Data" Agrawal et al. Nov. 29, 2000.

U.S. patent application Ser. No. 09/500,263, Agrawal et al., filed Feb. 8, 2000, 707/1.

U.S. patent application Ser. No. 09/564,344, Malloy et al., filed May 4, 2000, 707/1.

U.S. patent application Ser. No. 09/565,132, Malloy et al., filed May 4, 2000, 707/503.

Sarawagi et al. (1998), "Discovery–driven exploration of Olap Cubes", Advances in Database Technology –EDBT 98, pp. 168–182.

* cited by examiner

Primary Examiner—Charles Rones
Assistant Examiner—Michael Spiegel
(74) Attorney, Agent, or Firm—Ohlandt, Greeley, Ruggiero & Perle, L.L.P.; Christine H. Smith

(57) ABSTRACT

There is provided a method for providing a function for use in detecting a presence of an exception in multidimensional data. The method comprises the steps of (a) partitioning the multidimensional data into at least a first region and a second region; (b) assigning a first region-specific function to the first region and a second region-specific function to the second region; and (c) determining a combined function from the first region-specific function and the second region-specific function. The combined function is used to calculate an expected value of the multidimensional data for distinguishing the presence of an exception.

21 Claims, 4 Drawing Sheets

EMPLOYING A COMBINED FUNCTION FOR EXCEPTION EXPLORATION IN MULTIDIMENSIONAL DATA

BACKGROUND OF THE INVENTION

1. Field of the Invention

The present invention relates to multidimensional data, and more particularly, to a method and system for providing a function for use in finding exceptions in the multidimensional data.

2. Description of the Prior Art

On-Line Analytical Processing (OLAP) is a computing technique for summarizing, consolidating, viewing, applying formulae to, and synthesizing data according to multiple dimensions. OLAP software enables users, such as analysts, managers and executives, to gain insight into performance of an enterprise through rapid access to a wide variety of data views that are organized to reflect the multidimensional nature of the enterprise performance data. An increasingly popular data model for OLAP applications is the multidimensional database (MDDB), which is also known as the data cube. OLAP data cubes are predominantly used for interactive exploration of performance data for finding regions of anomalies in the data, which are also referred to as exceptions or deviations. Problem areas and/or new opportunities are often identified when an anomaly is located.

An exception is defined by first considering a two-dimensional data cube having p values along a first dimension A and q values along a second dimension B. The element or quantity corresponding to the ith value of dimension A and jth value of dimension B is denoted as $y_{ij}$. To estimate the degree of surprise $y_{ij}$ holds in this data cube, an expected value $\hat{y}_{ij}$ of $y_{ij}$ is calculated as a function f of three terms: (1) a term $\mu$ that denotes a trend that is common to all y values of the cube, (2) a term $\alpha_i$ that denotes special trends along the ith row with respect to the rest of the cube, and (3) a term $\beta_j$ that denotes special trends along the jth column with respect to the rest of the cube. The residual difference $r_{ij}$ between the expected value $\hat{y}_{ij}=f(\mu, \alpha_i, \beta_j)$, and the actual value $y_{ij}$ represents the degree of surprise of element $y_{ij}$ based on its position in the cube.

When the data cube has three dimensions, for example, with dimension C being the third dimension, the expected value $\hat{y}_{ijk}$ is calculated by taking into account not only the kth value of the third dimension, but also the three values corresponding to the pairs (i,j) in the AB plane, (i,k) in the AC plane and (j,k) in the BC plane. The expected value $\hat{y}_{ijk}$ is then expressed as a function of seven terms as:

$$\hat{y}_{ijk}=f(\mu, \alpha_i, \beta_j, \gamma_k,(\alpha\beta)_{ij},(\beta\gamma)_{ik},(\gamma\beta)_{kj}), \quad (1)$$

where $(\alpha\beta)_{ij}$ denotes the contribution of the ijth value in the AB plane, $(\alpha\gamma)_{ik}$ denotes the contribution of jkth value in the AC plane, and $(\gamma\beta)_{kj})$ denotes the contribution of the kjth value in the BC plane. In general, for any k dimensional cube, the y value can be expressed as the sum of the coefficients corresponding to each of the 2k−1 levels of aggregations or group-bys of the cube. To illustrate, a 3-dimensional cube will be considered.

The function f( ) can take several forms or models. Two particularly useful forms are an additive form, where function f( ) is a simple addition of all its arguments, and a multiplicative form, where function f( ) is a product of all its arguments. The multiplicative form can be transformed to the additive form by performing a logarithm on the original data values. Thus, the final form of Eq. (1) is, $$y_{ijk}=\hat{y}_{ijk}+r_{ijk}=\mu+\alpha_i+\beta_j+\gamma_k+(\alpha\beta)_{ij}+(\alpha\gamma)_{ik}+(\gamma\beta)_{jk}, \quad (2)$$

where $r_{ijk}$ is the residual difference between the expected value $\hat{y}_{ij}=f(\mu, \alpha_i, \beta_j)$ and the actual value $y_{ij}$. The relative importance of an exception is based on the relative value of its residual, that is, the higher the value of the residual, the higher the importance of the exception.

For a multiplicative model, the $y_{ijk}$ values denote the log of the original y-values of the cube. The choice of the best form of the function depends on the particular class of data, and is preferably selected by a user having the understanding and experience with the data at hand.

There are several ways for deriving values of the coefficients of Eq. (2). One approach is by a mean-based method where the coefficients are estimated as follows:

$$\mu=y_{...}=\text{overall mean or average} \quad (3)$$

$$\alpha_i=y_{i..}-\mu, \quad (4)$$

where $y_{i..}$ is the mean over all numbers with the ith value of A. Thus, for a two-way table, $\alpha_i$ denotes the magnitude of the difference of the average of the numbers along the ith row from the overall average $\mu$.

$$\beta_j=y_{.j.}-\mu, \quad (5)$$

where $y_{.j.}$ is the mean over all numbers with the jth value of B.

$$\gamma_k=y_{..k}-\mu, \quad (6)$$

where $y_{..k}$ is the mean over all numbers with the kth value of C. Lastly, $$(\alpha\beta)_{ij}=y_{ij}-\alpha_i-\beta_j-\mu \quad (7)$$

The remaining terms are defined analogously.

In general, the coefficient corresponding to any group-by G is recursively calculated by subtracting all coefficients from group-bys that are at a smaller level of detail than group G from the average y value at group-by G.

The mean-based approach for calculating the coefficients is not particularly robust in the presence of extremely large outliers. Consequently, a number of well-known alternative approaches for handling large outliers can be used, such as the median polish method and the square combining method, disclosed by D. Hoaglin et al., Exploring data tables, trends and shapes, Wiley series in probability, 1988, and incorporated by reference herein. These two alternative approaches are based on using a "median" instead of "mean" for calculating the coefficients. Nevertheless, these alternative approaches have an associated high computational cost. Consequently, the mean-based approach is preferred for most OLAP data sets because significantly large outliers are uncommon in most data sets.

The technique for determining residual and coefficients can be extended to handle hierarchies along one or more dimensions of a data cube. The basic idea is to define the expected value of a data cube element, not only based on its row and column position, but also on its hierarchical parents. For instance, consider values $y_{ij}$ in a data cube consisting of two dimensions A and B, where dimension A has two levels of hierarchies: $A^1 \rightarrow A^2 \rightarrow$ ALL. To calculate an expected value $\hat{y}_{ij}$ at the $A^1B$ level, the row coefficient $\alpha_i$ at level $A^1$, the column coefficient $\beta_j$ at level B and overall coefficient $\mu$ at level ALL, two new terms corresponding to the two new aggregations $A^2$ and $A^2B$ along the hierarchy on A are used. Equation (2) thus becomes:

$$\hat{y}_{ij} = \mu + \alpha_i + \beta_j + \alpha'_{i'} + (\alpha'\beta)_{i'j} \quad (8)$$

where i' denotes the parent of i at hierarchy level $A^2$, $\alpha'_{i'}$ denotes the contribution of the ith value at level $A^2$, and $(\alpha'\beta)_{i'j}$ denotes the contribution due to the ijth value at level $A^2B$.

The general formula for handling hierarchies is to express a y value in a cube in terms of coefficients obtained from all higher level aggregations of the cube. For example, for the y-values at $A^1B$ in Eq. (8), coefficients from the five higher level aggregates are used, that is, $A^1$, $A^2$, B, $A^2B$, and ALL. The same recursive rule of the previous subsection is followed for estimating the coefficients, where $\mu$ is first estimated as the overall average, and then for terms corresponding to each group-by G. The average at group-by G is computed and then the coefficients from each child of G are subtracted from the computed average.

"ANalysis Of VAriance"(ANOVA) is a well-known statistical technique described by D. G. Montgomery, in 'Design and Analysis of experiments', Chapter 13, John Wiley & Sons, Third edition, 1991. Current models are adapted versions of the general ANOVA model.

Using the standard ANOVA based model using a linear function, and adapting it by extending Eq. (1) for n-dimensional data and for function 'f' as log-linear, for a value $y_{i1,i2,\ldots,in}$ in a cube C, e.g., a multidimensional data model, at position $i_r$ of the $r^{th}$ dimension $d_r$ ($1 \leq r \leq n$), the anticipated value $\hat{y}_{i1,i2,\ldots,in}$ as a function f of contributions from various higher group-bys as:

$$\hat{y}_{i1,i2,\ldots in} = f(\gamma^G(i_r \mid d_{r \in G}) \mid G \subset \{d_1, d_2, \ldots, d_n\})$$

$$\hat{y}_{i1,i2,\ldots in} = \prod_{G \subset \{d_1, d_2, \ldots, d_n\}} \gamma^G(i_r \mid d_{r \in G})$$

The $\gamma$ terms as the coefficients of the model equation are:

$$\hat{y}_{i1,i2,\ldots in} = \sum_{G \subset \{d_1, d_2, \ldots, d_n\}} \Phi^G(i_r \mid d_{r \in G})$$

$\Phi_0 = \Phi_{+,+,\ldots,+}$ = Overall mean of all cells of a certain aggregation level where $\Phi_{i1,i2,\ldots in} = \log(y_{i1,i2,\ldots in})$ $\Phi_{i_r}^{A_r} = \Phi_{i1,+,\ldots,+,i_r,+} - \Phi_0$ and so on ...

Then the residual of the model is defined as:

$$r_{i1,i2,\ldots in} = |y_{i1,i2,\ldots in} - \hat{y}_{i1,i2,\ldots in}|$$

The greater the value of $r_{i1,i2,\ldots,in}$, the more likely that the tuple (i.e., the cell in the multidimensional data for which an expected value is being calculated) is an exception in the data model. However, the residual value must be standardized for meaningful comparison. A "standardized residual value" is calculated as follows:

$$s_{i1,i2,\ldots in} = |y_{i1,i2,\ldots in} - \hat{y}_{i1,i2,\ldots in}| / \sigma_{i1,i2,\ldots in}$$

The step of standardization is performed because the magnitude of the residual might appear to be large if the values in the multidimensional data are large. Considering the magnitude of the residual alone can be misleading because the residual should be evaluated in relative terms of the neighborhood of the cell in order for it to be termed as an exception. This is achieved by a normalization process. The value of $\sigma_{i1,i2,\ldots in}$ is the normalizer. One way to calculate it is as associated standard deviation for that tuple $y_{i1,i2,\ldots in}$. The standardized residual can then be used to rank the exceptions that are found. The higher the value of the standardized residual, the higher is the rank. The first exception in a decreasingly sorted array of exceptions will have the highest value of the standardized residual.

In classical ANOVA techniques, the standard deviation for all the cells is assumed to be identical. The variance, i.e., square of standard deviation, is estimated as the sum of squares of the residuals divided by the number of entries. Unfortunately, this technique provides poor fits on OLAP data. In the analysis of contingency tables, where cell entries represent counts, the Poisson distribution is assumed. This assumption implies that the variance is equal to the mean. When the entries are not counts, e.g., large dollar values, this typically leads to an underestimate of the variance.

The variance is modeled as a power $\rho$ of the mean value $\hat{y}_{i_1 \ldots i_n}$ as:

$$\sigma_{i_1 i_2 \ldots i_n}^2 = (\hat{y}_{i_1 i_2 \ldots i_n})^\rho. \quad (9)$$

To calculate $\rho$ one can use the maximum likelihood principle on data assumed to be distributed normally with the mean value $\hat{y}_{i_1 i_2 \ldots i_n}$. The maximum likelihood principle is described by Cooley et. al., Multivariate Data Analysis, Robert E. Krieger Publishers, 1986, which is herein incorporated by reference. One can derive that the estimated value of $\rho$ that must satisfy:

$$\sum \frac{(y_{i_1 i_2 \ldots i_n} - \hat{y}_{i_1 i_2 \ldots i_n})^2}{(\hat{y}_{i_1 i_2 \ldots i_n})^\rho} \cdot \log \hat{y}_{i_1 i_2 \ldots i_n} - \sum \log \hat{y}_{i_1 i_2 \ldots i_n} = 0 \quad (10)$$

The estimation of variance requires us to solve Eq. (10). A technique for solving Eq. (10) to find $\rho$ is discussed below. Since a closed form solution of this equation is not available, it is solved iteratively by evaluating Eq. (10) for a fixed set of values of $\rho$, for example 10 values equally spaced between 0 and 3. The final value is a point between the two points where the sign of the left hand side of Eq. (10) changes. If the value of $\rho$ happens to fall outside the chosen range, e.g., [0,3], then a re-scan of the data with an expanded range, e.g., [0,5], is performed.

Exceptions in a multidimensional data model, such as an OLAP cube, are deviations from underlying trends in the data model. The current "deviation detection" module of the DB2 OLAP Server uses a log-linear form of function 'f' described in Eq.(1). However, the log-linear function is not effective when the multidimensional data, e.g. an OLAP cube, includes negative values and/or zeros. That is, the log-linear function is effective only when the values in the multidimensional data are all positive. Because of this shortcoming, the log-linear function is inappropriate for many practical applications, such as commercial and financial multidimensional data, that involve zero or negative numbers as values in the multidimensional data, e.g., percentage of change, loss values, etc. There is also a possibility of resolution degradation if the numbers in the cube are nearly equal to zero.

SUMMARY OF THE INVENTION

It is an object of the present invention to provide an improved method for exploring for exceptions in multidimensional data that may include negative values, zero, and positive values.

It is another object of the present invention to provide such a method that by determining a function that is defined for all values of the multidimensional data.

It is yet another object of the present invention to provide such a method that efficiently recognizes exceptions by calculating a standarized residual value for an expected value of data.

These and other objects of the present invention are achieved by a method for providing a function for use in detecting a presence of an exception in multidimensional data, comprising the steps of (a) partitioning the multidimensional data into at least a first region and a second region; (b) assigning a first region-specific function to the first region and a second region-specific function to the second region; and (c) determining a combined function from the first region-specific function and the second region-specific function. The combined function is used to calculate an expected value of the multidimensional data for distinguishing the presence of an exception.

Another embodiment of the present invention is a method for providing a function for use in detecting a presence of an exception in multidimensional data. The method comprises the steps of (a) partitioning the multidimensional data into at least a first region and a second region, (b) assigning a first region-specific function to the first region and a second region-specific function to the second region, wherein each of the first and second region-specific functions satisfy a set of predetermined conditions in its assigned region, (c) determining a combined function from the first region-specific function and the second region-specific function, and (d) adjusting a limit of the first region and a limit of the second region so that the combined function satisfies the set of predetermined conditions for all values of the multidimensional data. The combined function is used to calculate an expected value of the multidimensional data for distinguishing the presence of an exception.

DESCRIPTION OF THE INVENTION

The present invention identifies regions of multidimensional data where appropriate non-linear functions can be used for exploration of exceptions in the data. Since the log-linear function is not defined for non-positive values, it will not produce correct results if the multidimensional data includes zero and/or negative values.

To overcome this drawback, the present invention partitions, into two or more regions, the variable space of the log-linear function where the log-linear function is not defined. For each of the two or more regions, it applies an appropriate region-specific function and then evolves a single combined function from a union of multiple appropriate region-specific functions.

The desired conditions for the individual region-specific functions and also for the resultant combined function are:

1. The function preserves a multiplicative form. A multiplicative form is one in which a function is a product of all its arguments. In most of the OLAP type of multidimensional data applications for which exception exploration is performed, the data models involve sum, count type of functions for typical OLAP rollup aggregations. These aggregations can be best approximated by the multiplicative form as:

$$f(C)=f(C1) \times f(C2) \times f(Cn) \text{ where } C=\cup Ci(1 \ldots i \ldots n)$$

2. The function is continuous or very nearly continuous.
   If $a \leq y^* \leq b$, then $J(y)$ is continuous in $[a,b]$
   iff $\forall \epsilon >0$, there is a $\delta>0$
   so that $|J(y^*)-J(y)|<\epsilon$ if $|y^*-y|<\delta$.
   Very nearly continuous, i.e., substantially continuous, means that for all $y^*$ in $[a,b]$, and $|y^*-y|<\delta$; it is possible to find a sufficiently small $\epsilon$ so that $|(J(y^*)-J(y)|<\epsilon$.

3. The function $J(y)$ is monotonic. This mean that for the region $[a,b]$
   For all $y1$, $y2$ in $[a,b]$, if $y1 \leq y2$, then $J(y1) \leq J(y2)$.

Within this document, these three conditions are referred to as "the desired conditions". Multiplicative form, continuity or very near continuity and monotonicity are three desired conditions. However, other conditions, such as differentiability, may also be desirable.

Figure 1:
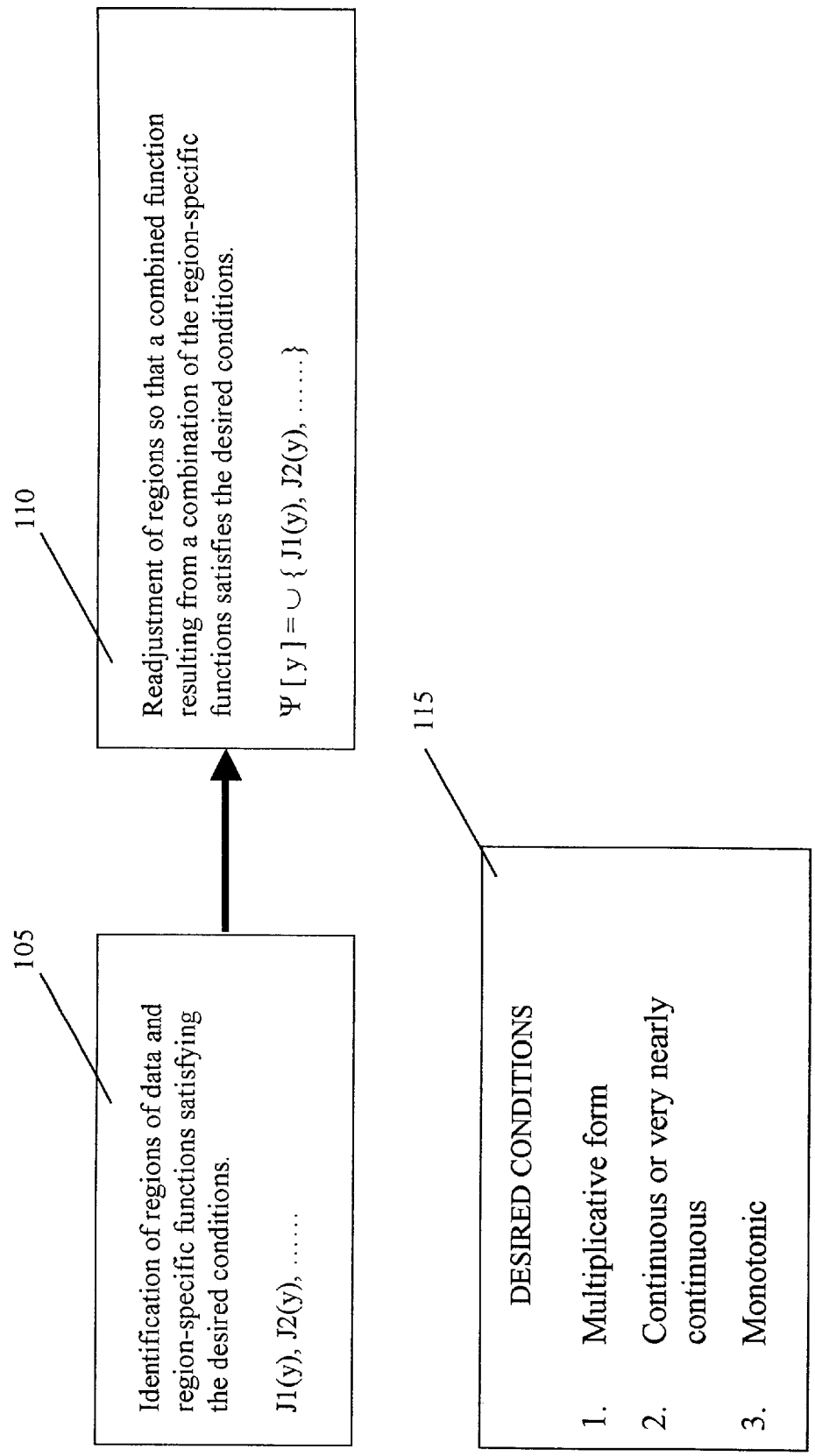
FIG. 1 is a flowchart of method for determining a combined function in accordance with the present invention.

FIG. 1 is a flowchart of method for evolving a combined function in accordance with the present invention. The desired conditions, as described above, are listed in block 115. The method begins with step 105.

In step 105, the multidimensional data is partitioned into regions of variable space, which collectively cover all potential values of the multidimensional data. A region-specific function is assigned to each region. A region-specific function is one that satisfies the desired conditions of block 115 for the region to which the region-specific function is assigned. For example, assume that the variable space is partitioned into region 1, region 2, etc. A region-specific function J1(1) is assigned to region 1 and satisfies the desired conditions of block 115 for region 1. Likewise, a region-specific function J2(y) is assigned to region 2 and satisfies the desired conditions of block 115 for region 2. The method then progresses to step 110.

In step 110, the region-specific functions J1(y), J2(y), . . . are combined to produce a resultant combined function Ψ[y]. The resultant combined function Ψ[y] is a union of the region-specific functions J1(y), J2(y), . . . , and preferably satisfies the desired conditions of block 115 for the full range of variable space.

The following is an example for the case of the log-linear function.

1. The log function is not defined for values <0, and the log function becomes dramatically negative for values of (0,1). However, the log function is a preferred function for positive values of y>1, because in the region y>1 it preserves the multiplicative form of f in Eq.(1), it is monotonic and it is continuous. Hence the region of y=(-∞, ∞) is first partitioned into two regions. The first region is A=(-∞, 1) and the second region is B=[1, ∞). For region B, the log function is selected as the region-specific function.

2. Region A can be further split into two regions viz. A1=(-∞, -1) and A2=[-1,1). This is because one can select and still use the region-specific function –log(–

Y) for region A1 as it maintains the multiplicative form of f, is monotonic and continuous for region A1.

3. For region A2, the tan h (hyperbolic tangent) function is selected as the region-specific function because for values of x between −1 and 1, tan h(y) preserves the desired conditions described earlier. Also, it provides a possible smooth transition from A1 to B.

Figure 2:
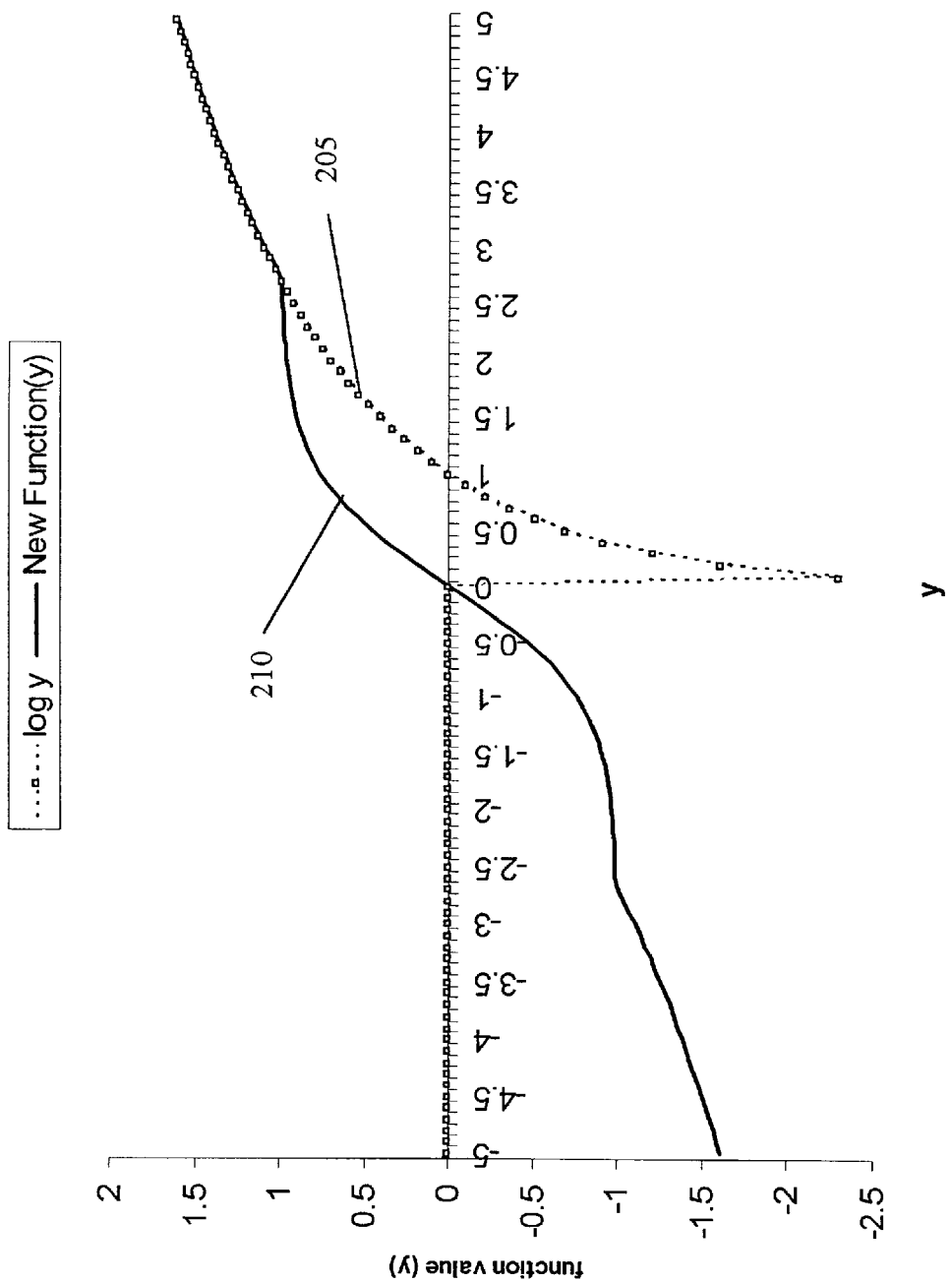
FIG. 2 is a graph showing a comparison of a log-linear function with a generalized combined function of the present invention.

4. One can find one point in region A (values of y) where tan h(y) is very nearly the same as −log(−y), and in region B where tan h(y) is very nearly the same as log(y). Those points are denoted as m and approximately found as m=±2.69364.[solving tan h(y)=log(y)]. Thus one can evolve a combined function $\Psi(y)$ as:

$\Psi[y]$: $y>=m$, Then $\Psi=\log(y)$ $-m<y<m$ Then $\Psi=\tan h(y)$ $\{-[e^y-e^{-y}]/[e^y+e^{-y}]\}$ $y>=-m$ Then $\Psi=-\log(-y)$ FIG. 2 is a graph showing a comparison of a log-linear function with a generalized combined function $\Psi(y)$ of the present invention. FIG. 2 shows that the log(y) function 205 of the prior art is not defined for values of y≦0, whereas the generalized resultant function $\Psi(y)$ 210 of the present invention is defined for all values of y. The resultant function $\Psi(y)$ 210 is a general form of a combined function that evolved from a combination of several region-specific functions for different regions of variable y.

Region 1: y=(−∝,−2.69364] region-specific function=f(y)=−log(−y).

Region 2: y=(−2.69364, 2.69364) region-specific function =f(y)=tan h(y).

Region 3: y=[2.69364, ∝) region-specific function=f(y)= log(y).

All regions of y=(−∝, ∝) combined function=$\Psi(y)$.

The limits of the regions are adjusted so that at the transition points y=±2.69364, the difference between the values of the combined function $\Psi(y)$ approaching from the negative direction and the positive direction is less than 1×10$^{-10}$, thereby making $\Psi(y)$ nearly continuous at these points. At all other points, the functions log(y), tan h(y) and −log(−y) are of closed form and are continuous in their respective regions, the combined function $\Psi(y)$ is at least nearly continuous everywhere, i.e., in the region of y=(−∝, ∝). The combined function $\Psi(y)$ is defined for all regions of y and it is monotonic. Thus, the combined function $\Psi(y)$ satisfies the desired conditions, as described earlier.

Now, one can describe the inverse of the combined function as $\Psi^{-1}[y]$ $\Psi^{-1}[y]$: $y>=1$, Then $\Psi^{-1}=e^y$ $-1<y<1$ Then $\Psi^{-1}=\tan h^{-1}(y)$ $\{=0.5 \ln ([1+y]/[1-y])\}$ $y<=-1$ Then $\Psi^{-1}=-e^{-y}$ Using the ANOVA-based model, but using the combined function $\Psi$, $$\Psi'_{i1,i2,...in} = \Psi_{G\subset\{d_1,d_2,...,d_n\}}(\hat{y}_{i1,i2,...in}) = \prod \gamma^G(i_r \mid d_{r\in G})$$

The $\gamma$ terms as the coefficients of the model equation are:

$$\Psi'_{i1,i2,...in} = \sum_{G\subset\{d_1,d_2,...,d_n\}} \Phi^G(i_r \mid d_{r\in G})$$

$$\Phi_0 = \Psi'_{+,+,...,+}$$

$$\Phi^{Ar}_{ir} = \Psi'_{i1,+,...,+,ir,+} - \Phi_0 \text{ and so on ...}$$

Then $$\hat{y}_{i1,i2,...in} = \Psi^{-1}[\Psi'_{i1,i2,...in}]$$

The residual of the model is defined as the difference between an actual value and a predicted value for a cell.

$$r_{i1,i2,...in} = |y_{i1,i2,...in} - \hat{y}_{i1,i2,...in}|$$

The greater the value of $r_{i1,i2,...in}$, the more likely that the tuple is an exception in the data model. However, as described earlier, the residual value must be standardized for meaningful comparison. This can be done by calculating the "standardized residual" as follows:

$$s_{i1,i2,...in} = |y_{i1,i2,...in} - \hat{y}_{i1,i2,...in}|/\sigma_{i1,i2,...in}$$

If the multidimensional data contains zeros and/or negative numbers, the value of the normalizer $\sigma_{i1,i2,...in}$ can be estimated as the square root of the sum of all squared residuals belonging to the same level of the OLAP cube for cell $y_{i1,i2,...in}$, by the number of cells within that aggregation level.

If the data has only positive values, then the value of the normalizer $\sigma_{i1,i2,...in}$ is calculated by solving Eq. (9) and Eq. (10). However, instead of solving Eq. (10) iteratively as described earlier, for all the steps in a pre-determined minimum and maximum value of the exponent, i.e., performing an exhaustive search, the present invention offers an alternative technique for solving Eq. (10) by performing a Fibonacci search. An example of this alternative is a calculation of ρ between a value of 0 and 5 with a Fibonacci series of size 13. The optimal value of ρ can be found in lesser number of passes than by performing an exhaustive search. Fibonacci Series [13]={1, 1, 2, 3, 5, 8, 13, 21, 34, 55, 89, 144, 233} minimum=0; maximum=5; experiments=11; The objective function to be minimized is:

$$Obj. \ Fn = \sum \frac{(y_{i_1 i_2...i_n} - \hat{y}_{i_1 i_2...i_n})^2}{(\hat{y}_{i_1 i_2...i_n})^\rho} \cdot \log \hat{y}_{i_1 i_2...i_n} - \sum \log \hat{y}_{i_1 i_2...i_n}$$

The value of ρ that returns the least value of the obj. function is the best fit. The Fibonacci search provides for a univariate search. If the value of $s_{i1,i2,...in}$ thus found is more than a predefined threshold, then $y_{i1,i2,...in}$ is considered as an exception.

Figure 3:
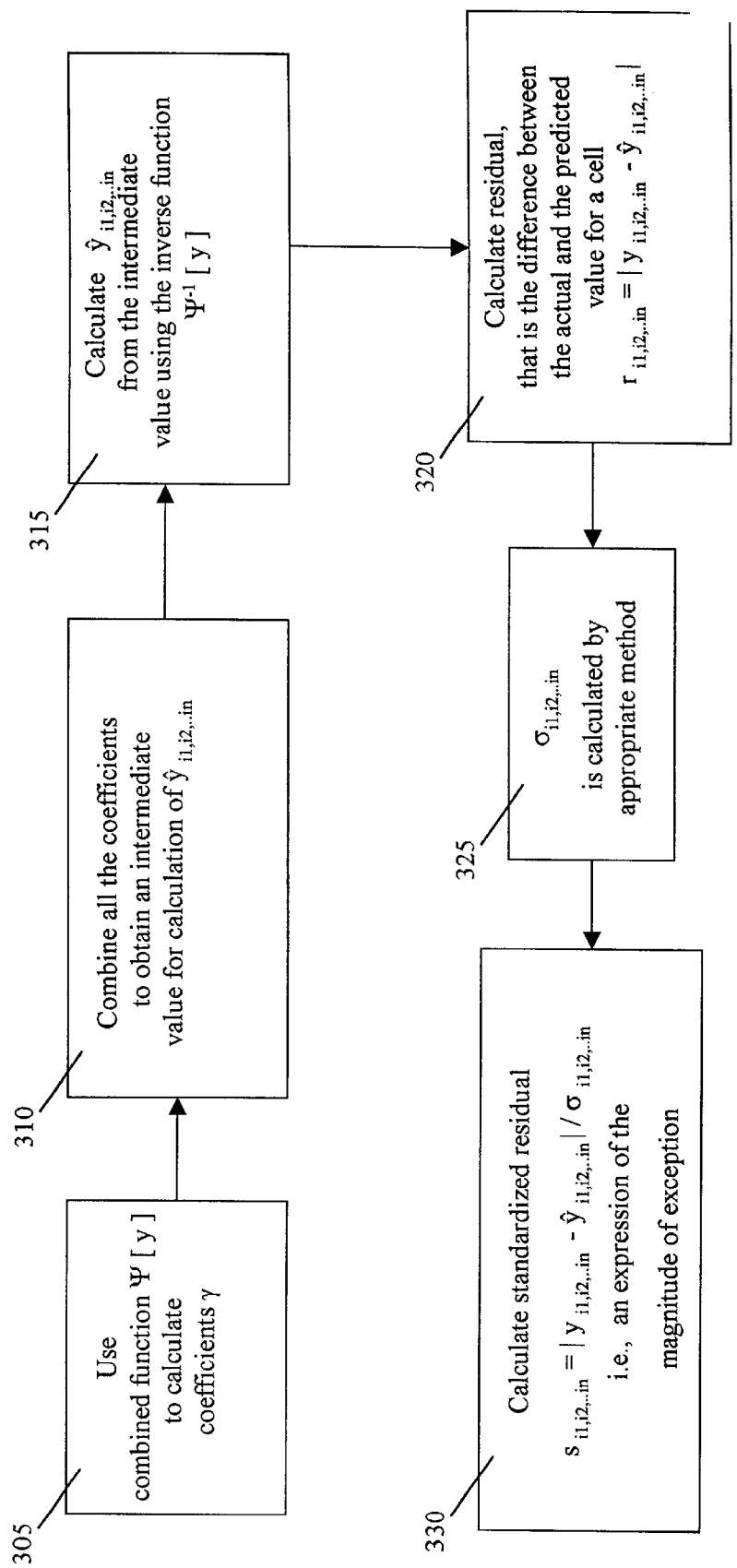
FIG. 3 is a flowchart of a method for exploring for an exception in multidimensional data using a combined function in accordance with the present invention.

FIG. 3 is a flowchart summarizing the method for exploring for an exception in multidimensional data using a combined function in accordance with the present invention. The method commences with step 305.

In step 305, the combined function $\Psi[y]$ is used to calculate coefficients γ. The method then progresses to step 310.

In step 310, the coefficients γ are combined to obtain an intermediate value for a subsequent calculation of $\hat{y}_{i1,i2,...in}$. The method then progresses to step 315.

In step 315, the inverse function $\Psi^{-1}[y]$ is used to calculate $\hat{y}_{i1,i2,...in}$ from the intermediate values found in step 310. The method then progresses to step 320.

In step 320, a residual value is calculated. The residual value is the difference between an actual value and a predicted value for a cell:

$$r_{i1,i2,\ldots in} = |y_{i1,i2,\ldots in} - \hat{y}_{i1,i2,\ldots in}|$$

The method then progresses to step 325.

In step 325, the normalizer $\sigma_{i1,i2,\ldots in}$ is calculated by an appropriate method. For example, it can (a) be estimated as the square root of the sum of all squared residuals belonging to the same level of the OLAP cube for cell $y_{i1,i2,\ldots in}$, divided by the number of cells within that aggregation level, or (b) calculated by solving Eq.(10) by using the Fibonacci search for ρ which in turn yields the normalizer using Eq. (9). The method then progresses to step 330.

In step 330, a standardized residual is calculated as:

$$s_{i1,i2,\ldots in} = |y_{i1,i2,\ldots in} - \hat{y}_{i1,i2,\ldots in}|/\sigma_{i1,i2,\ldots in}$$

If the value of $s_{i1,i2,\ldots in}$ thus found is more than a predefined threshold, then $y_{i1,i2,\ldots in}$ is considered as an exception.

Figure 4:
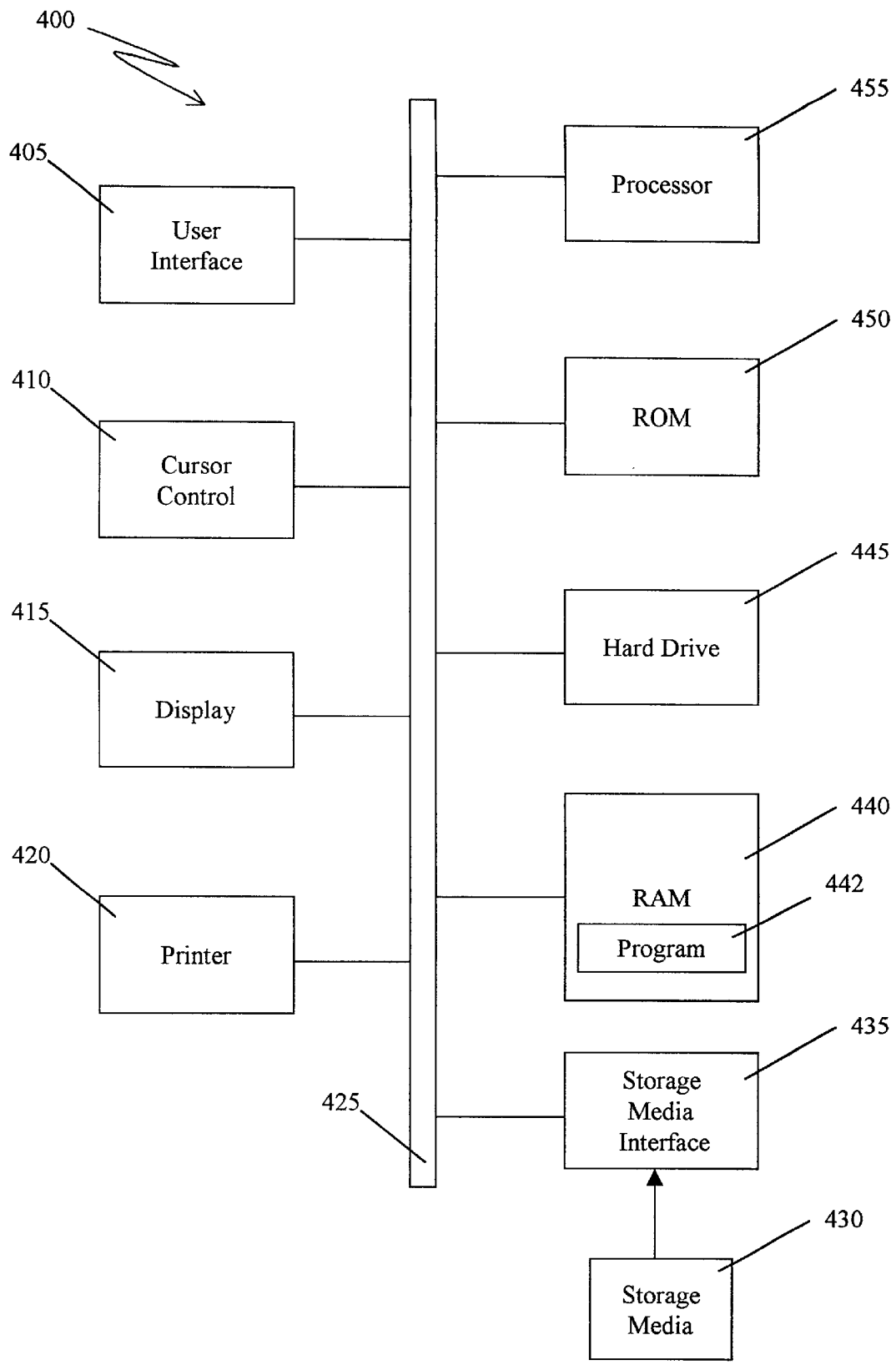
FIG. 4 is a block diagram of a computer system suitably configured for employment of the present invention.

FIG. 4 is a block diagram of a computer system 400 suitably configured for employment of the present invention. System 400 may be implemented on a general purpose microcomputer, such as one of the members of the SUN Microsystems family of computer systems, one of the members of the IBM Personal Computer family, or any conventional work-station or graphics computer device. Although system 400 is represented herein as a standalone system, it is not limited to such, but instead can be part of a networked system. System 400 includes a user interface 405, a cursor control 410, a display 415, a printer 420, a processor 455, a read only memory (ROM) 450, a hard drive 445, a random access memory (RAM) 440, and a removable storage interface 435, all of which are coupled to a bus 425 or other communication means for communicating information.

RAM 440, hard drive 445 and ROM 450, are memory components that store data and instructions for controlling the operation of processor 455, which may be configured as a single processor or as a plurality of processors. Processor 455 executes a program 452 to perform a method in accordance with the present invention as described herein.

While program 442 is indicated as already loaded into RAM 440, it may be configured on a storage media 430 for subsequent loading into hard drive 445, ROM 450 or RAM 440 via an appropriate storage media interface 435. Storage media 430 can be any conventional storage media such as a magnetic tape, an optical storage media, a compact disk, or a floppy disk. Alternatively, storage media 430 can be a random access memory, or other type of electronic storage, located on a remote storage system.

User interface 405 is an input device, such as a keyboard or speech recognition subsystem, for enabling a user to communicate information and command selections to processor 455. The user can observe information generated by system 400 via display 415 or printer 420. Cursor control 410 is a device such as a mouse, track-ball, or joy stick, that allows the user to manipulate a cursor on display 415 for communicating additional information and command selections to processor 455.

In one embodiment of the present invention, system 400 provides a function for use in detecting a presence of an exception in multidimensional data. Processor 455 and program 442 operate collectively operate as a module for (a) partitioning the multidimensional data into at least a first region and a second region, (b) assigning a first region-specific function to the first region and a second region-specific function to the second region, and (c) determining a combined function from the first region-specific function and the second region-specific function. The combined function is used to calculate an expected value of the multidimensional data for distinguishing the presence of an exception.

It should be understood that various alternatives and modifications can be devised by those skilled in the art when guided by the teachings herein. For example, one could have selected {−log(−y); sin(y) and log(y)} as a set of three region-specific functions for appropriate transition points by solving sin(y)=log(y) and sin(y)=−log(−y). It is important to note that the combined function is not necessarily symmetric and it does not necessarily partition the variable into only three regions. The only conditions are the desired conditions described earlier. Accordingly, the present invention is intended to embrace all alternatives, modifications and variances that fall within the scope of the appended claims.

What is claimed is:

1. A method for providing a function for use in detecting a presence of an exception in multidimensional data, comprising:

partitioning said multidimensional data into at least a first region and a second region;

assigning a first region-specific function to said first region and a second region-specific function to said second region; and determining a combined function from said first region-specific function and said second region-specific function, wherein said combined function is used to calculate an expected value of the multidimensional data for distinguishing the presence of an exception.

2. The method of claim 1, wherein said first and second region-specific functions each satisfy a set of predetermined conditions in its assigned region.

3. The method of claim 2, wherein said set of predetermined conditions comprises a condition that each of said first and second region-specific functions conform to a multiplicative form in its assigned region.

4. Then method of claim 2, wherein said set of predetermined conditions comprises a condition that each of said first and second region-specific functions is continuous or very nearly continuous in its assigned region.

5. The method of claim 2, wherein said set of predetermined conditions comprises a condition that each of said first and second region-specific functions is monotonic in its assigned region.

6. The method of claim 1, wherein each of said first and second region-specific functions satisfy the following conditions in its assigned region:

(a) multiplicative form;

(b) continuous or very nearly continuous; and (c) monotonic.

7. The method of claim 6, wherein said combined function satisfies said conditions for all values of said multidimensional data.

8. The method of claim 6, further comprising adjusting a limit of said first region and a limit of said second region so that said combined function satisfies said conditions for all values of said multidimensional data.

9. The method of claim 1, further comprising adjusting a limit of said first region and a limit of said second region so that said combined function is continuous or very nearly continuous at a point of transition between said first region and said second region.

10. The method of claim 1, wherein said combined function comprises a union of the said first and second region-specific functions.

11. The method of claim 1,
wherein said multidimensional data comprises only positive values, and
wherein said method further comprises employing a Fibonacci search for calculating a standardized residual that is used for distinguishing the presence of an exception.

12. The method of claim 1,
wherein said first and second regions are two of a plurality of regions, and
wherein said plurality of regions comprise all potential values of said multidimensional data.

13. The method of claim 1, wherein said assigning comprises selecting said first-region specific function and said second region-specific function from a set of functions comprising the functions of $\log(y)$, $\sin(y)$ and $\tan h(y)$.

14. A method for providing a function for use in detecting a presence of an exception in multidimensional data, comprising:
partitioning said multidimensional data into at least a first region and a second region;
assigning a first region-specific function to said first region and a second region-specific function to said second region, wherein each of said first and second region-specific functions satisfy a set of predetermined conditions in its assigned region;
determining a combined function from said first region-specific function and said second region-specific function; and
adjusting a limit of said first region and a limit of said second region so that said combined function satisfies said set of predetermined conditions for all values of said multidimensional data,
wherein said combined function is used to calculate an expected value of the multidimensional data for distinguishing the presence of an exception.

15. The method of claim 14, wherein said set of predetermined conditions comprise the following conditions:
(a) multiplicative form;
(b) continuous or very nearly continuous; and
(c) monotonic.

16. The method of claim 14,
wherein said multidimensional data comprises only positive values, and
wherein said method further comprises employing a Fibonacci search for calculating a standardized residual that is used for distinguishing the presence of an exception.

17. The method of claim 14, wherein said assigning comprises selecting said first-region specific function and said second region-specific function from a set of functions comprising the functions of $\log(y)$, $\sin(y)$ and $\tanh(y)$.

18. A storage media containing instructions for controlling a processor for providing a function for use in detecting a presence of an exception in multidimensional data, said storage media comprising:
instructions for controlling said processor to partition said multidimensional data into at least a first region and a second region;
instructions for controlling said processor to assign a first region-specific function to said first region and a second region-specific function to said second region; and
instructions for controlling said processor to determine a combined function from said first region-specific function and said second region-specific function,
wherein said combined function is used to calculate an expected value of the multidimensional data for distinguishing the presence of an exception.

19. A storage media containing instructions for controlling a processor for providing a function for use in detecting a presence of an exception in multidimensional data, said storage media comprising:
instructions for controlling said processor to partition said multidimensional data into at least a first region and a second region;
instructions for controlling said processor to assign a first region-specific function to said first region and a second region-specific function to said second region, wherein each of said first and second region-specific functions satisfy a set of predetermined conditions in its assigned region;
instructions for controlling said processor to determine a combined function from said first region-specific function and said second region-specific function; and
instructions for controlling said processor to adjust a limit of said first region and a limit of said second region so that said combined function satisfies said set of predetermined conditions for all values of said multidimensional data,
wherein said combined function is used to calculate an expected value of the multidimensional data for distinguishing the presence of an exception.

20. A system for providing a function for use in detecting a presence of an exception in multidimensional data, comprising:
a module for partitioning said multidimensional data into at least a first region and a second region;
a module for assigning a first region-specific function to said first region and a second region-specific function to said second region; and
a module for determining a combined function from said first region-specific function and said second region-specific function,
wherein said combined function is used to calculate an expected value of the multidimensional data for distinguishing the presence of an exception.

21. A system for providing a function for use in detecting a presence of an exception in multidimensional data, comprising:
a module for partitioning said multidimensional data into at least a first region and a second region;
assigning a first region-specific function to said first region and a second region-specific function to said second region, wherein each of said first and second region-specific functions satisfy a set of predetermined conditions in its assigned region;
determining a combined function from said first region-specific function and said second region-specific function; and
adjusting a limit of said first region and a limit of said second region so that said combined function satisfies said set of predetermined conditions for all values of said multidimensional data,
wherein said combined function is used to calculate an expected value of the multidimensional data for distinguishing the presence of an exception.

* * * * *